United States Patent [19]

Tanaka et al.

[11] Patent Number: 4,796,586

[45] Date of Patent: Jan. 10, 1989

[54] METHOD OF AND APPARATUS FOR CONTROLLING IGNITION TIMING IN INTERNAL COMBUSTION ENGINE

[75] Inventors: Akira Tanaka; Akira Nagao; Yukihiko Suzaki; Hideji Yamada; Toyohei Nakajima; Toshiyuki Mieno, all of Wako, Japan

[73] Assignee: Honda Giken Kogyo Kabushiki Kaisha, Tokyo, Japan

[21] Appl. No.: 74,606

[22] Filed: Jul. 17, 1987

[30] Foreign Application Priority Data

Jul. 22, 1986 [JP] Japan ............................... 61-170934
Jul. 22, 1986 [JP] Japan ............................... 61-170931

[51] Int. Cl.$^4$ ........................................... F02P 5/15
[52] U.S. Cl. ............................................... 123/425
[58] Field of Search ................... 123/425, 435; 73/35

[56] References Cited

U.S. PATENT DOCUMENTS 4,527,524  7/1985  Guipaud ........................ 123/425
4,582,034  4/1986  Iwata ............................ 123/425
4,631,680 12/1986  Korb et al. ................ 123/425 X

FOREIGN PATENT DOCUMENTS 75965     6/1981  Japan ........................... 123/425
60-85252  5/1985  Japan .

Primary Examiner—Tony M. Argenbright
Attorney, Agent, or Firm—Armstrong, Nikaido, Marmelstein & Kubovcik

[57] ABSTRACT

A method of and an apparatus for controlling ignition timing in an internal combustion engine. When the ignition timing has been retarded for preventing knocking and the engine operation thereafter moves into a region of operation where knocking control is unnecessary with the retardation of the ignition timing still in effect, the ignition timing is slightly advanced once per predetermined number of firings. Since the ignition timing is gradually restored, engine output hunting is prevented. The advancement of the ignition timing is determined whether or not a prescribed wait period has passed. The period varies depending on an engine speed.

3 Claims, 3 Drawing Sheets

METHOD OF AND APPARATUS FOR CONTROLLING IGNITION TIMING IN INTERNAL COMBUSTION ENGINE

BACKGROUND OF THE INVENTION

1. Field of the Invention

This invention relates to a method of and an apparatus for controlling ignition timing in an internal combustion engine, more specifically to a method of and an apparatus for controlling ignition timing in an internal combustion engine wherein in a case where, after retarding the ignition timing for preventing knocking, the engine speed falls below a prescribed level or the engine otherwise moves into a region of operation where knocking control is unnecessary with the ignition timing still retarded, advancement of the ignition timing for eliminating the retardation is carried out gradually.

2. Description of the Prior Art

In a method of and an apparatus for controlling ignition timing in an internal combustion engine, it is a common practice to detect when knocking begins and then adjust the basic ignition timing to cause the knocking to stop. In this case, after the occurrence of knocking has been detected, the basic ignition timing is subjected to retarding adjustment until the knocking stops, whereafter it is subjected to advancing adjustment to bring it back to the basic ignition timing. After retarding adjustment of the ignition timing has been implemented for the purpose of eliminating knocking, it may happen that with the retarding adjustment still in effect the engine moves into an operating region in which knocking control is unnecessary, as when the engine speed falls below a prescribed level or some other predetermined operating condition or conditions occur. In such cases, it is generally necessary to restore the ignition timing to the basic ignition timing. One example of such a device is disclosed in Japanese Laid-open Patent Application No. 60-85252. In prior art however, this is accomplished by advancing the ignition timing to the basic ignition timing in a single operation and, as result, hunting is caused such as by the accompanying variation in torque and the drivability of the vehicle powered by the engine is degraded.

SUMMARY OF THE INVENTION

In consideration of the aforesaid shortcomings of the prior art, it is an object of the invention to provide a method of and an apparatus for controlling the ignition timing in an internal combustion engine wherein hunting is prevented and the drivability of the vehicle is enhanced by gradually carrying out the advancing adjustment of the ignition timing rather than carrying it out at one time when the engine moves into an operating region in which knocking control is unnecessary.

Another object of the invention is to provide a method of and an apparatus for controlling the ignition timing of an internal combustion engine wherein frequency of knocking occurrence is made constant over all operating conditions of the engine while preventing recurrence of knocking is effectively prevented and the engine operation is optimized.

For achieving these objects the invention provides in its first aspect, a method of controlling ignition timing in an internal combustion engine which comprises, determining a basic ignition timing on the basic of an operating condition of the engine and adjusting the basic ignition timing for retard when knocking occurs while adjusting the ignition timing for advancement after knocking has been prevented. In the method, when the operation of the engine has moved into a region in which knocking control is unnecessary with the ignition timing still retarded, the ignition timing for advancement is slightly adjusted once per predetermined number of firings. The invention further provides in its second aspect, an apparatus for controlling ignition timing in an internal combustion engine which comprises, a device for detecting operating condition of the engine disposed at an appropriate part of the engine, a device for determining a basic ignition timing on the basis of the output of the operating condition detecting device, a device for sensing knocking occurring in a combustion chamber of the engine, a device for adjusting the ignition timing to prevent knocking which on the basis of the outputs of the knocking sensing device and the basic ignition timing determining device adjusts the basic ignition timing by retarding it by a predetermined amount when knocking is sensed, and adjusts the basic ignition timing by advancing it after knocking has been prevented, and an ignition device which ignites an air/fuel mixture in the combustion chamber upon receiving the output of the ignition timing adjustment device. In the apparatus, when the operation of the engine has moved into a region in which knocking control is unnecessary with the ignition timing still retarded, the ignition timing is slightly advanced once per predetermined number of firings, whereby the basic ignition timing is gradually restored.

The above and other features of the present invention will become apparent from the following description made with reference to the drawings.

DESCRIPTION OF THE PREFERRED EMBODIMENTS

The invention will now be explained with reference to the attached drawings.

Figure 1:
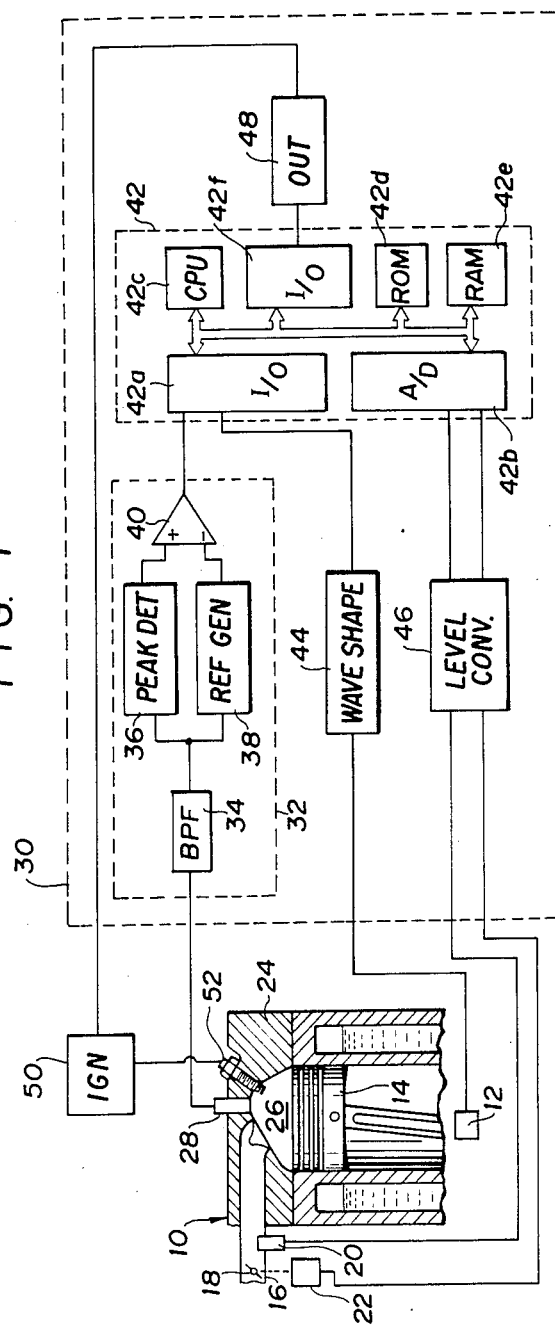
FIG. 1 is a block diagram showing the overall structure of an apparatus for controlling ignition timing in an internal combustion engine according to the invention.

Referring to FIG. 1, a crankshaft angle sensor 12, which may be constituted using an electromagnetic pickup or the like, is disposed in the vicinity of a rotating member of an internal combustion engine 10 for detecting the crankshaft angle of the internal combustion engine 10. A throttle valve 18 is provided in an air intake passage 16 and a pressure sensor 20 for detecting the absolute pressure of an air flowing at this point is provided downstream of the throttle valve 18. The detected pressure of the intake air is used for determining the engine load condition. A throttle sensor 22 constituted as a potentiometer or the like is provided in the vicinity of the throttle valve 18 for detecting the degree of opening thereof.

The internal combustion engine 10 is further provided at an appropriate part of a cylinder head 24 with a knocking sensor 28 comprising a piezoelectric element for sensing vibration of the head so as to detect the state of combustion of an air/fuel mixture in a combustion chamber 26. The output of the knocking sensor 28 is sent to a control unit 30 where it is input to a knocking detection circuit 32. In the knocking detection circuit 32, the signal from the knocking sensor 28 is initially input to a band pass filter 34 for extraction of only the knocking frequency component. The output of the band pass filter 34 is, on the one hand, sent to a peak detection circuit 36 where the peak value of the knocking signal is detected. It is also forwarded to a comparison reference value generator 38 where the mean value of the signal from the knocking sensor 28 during non-knocking operation is detected. The outputs of the peak detection circuit 36 and the comparison reference value generator 38 are sent to a comparator 40 where the two outputs are compared and when the peak value exceeds the mean value, it is determined that knocking has occurred. The stage following the knocking detection circuit 32 is a microcomputer 42. The main components of the microcomputer 42 are an input panel 42a, an A/D (analog/digital) converter 42b, a CPU (central processing unit) 42c, a ROM (read-only memory) 42d, a RAM (random access memory) 42e and an output panel 42f. The output of the knocking detection circuit 32 is input to the microcomputer 42 and stored in the RAM 42e.

The output of the crankshaft angle sensor 12 is also input to the control unit 30, wherein it is first shaped by a wave-shaping circuit 44 and then input to the microcomputer 42 via the input panel 42a for storage in the RAM 40e. The output of the pressure sensor 20 and the throttle sensor 22 are also input to the control unit 30 and are level-converted in a level converter 46 and then input to the microcomputer 42, where it is first converted to digital form by the A/D converter 42b and is then stored in the RAM 42e. The CPU 42c determines the ignition timing by using the outputs of the crankshaft angle sensor 12 and the pressure sensor 20 to retrieve mapped values stored in the ROM 42d. It also discriminates from the output of the knocking detection circuit 32 whether or not knocking has occurred and when knocking has occurred, it first adjusts (retards) the ignition timing by a predetermined amount and then after knocking has been avoided, further returns the ignition timing by a predetermined amount in the direction of ignition advance. The CPU 42c also calculates from the output of the throttle sensor 22 the rate of change in the opening of the throttle valve 18 per unit time and by comparing the calculated value with a predetermined value detecting whether or not the engine is in a transient state, particularly whether is in a rapidly accelerating state. The determined ignition timing is sent to an output circuit 48 constituting the next stage following the microcomputer 42, and from the output circuit 48 is sent to an ignition device 50, which may be an igniter or the like. The ignition device 50 actuates an ignition plug 52 so as to ignite the air/fuel mixture in the combustion chamber 26.

Figure 2:
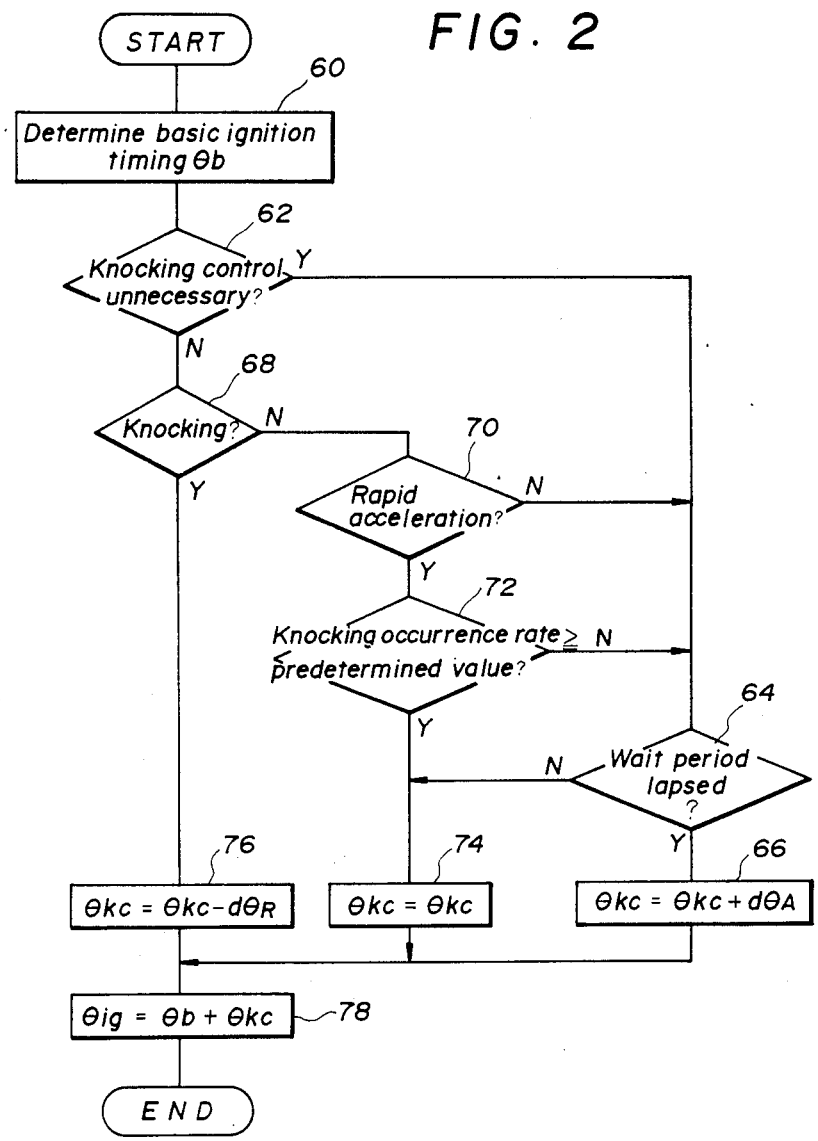
FIG. 2 is a flowchart showing the operation of the apparatus of FIG. 1 as well as an embodiment of a method of controlling ignition timing in an internal combustion engine according to the invention.

The operation of the apparatus as well as a method of controlling ignition timing according to the invention will now be explained with reference to FIG. 2.

First, in step 60, the basic ignition timing $\theta b$ is determined. Namely, the microcomputer 42 retrieves the ignition timing from mapped values stored in the ROM 42d using the outputs from the crankshaft angle sensor 12 and the pressure sensor 20 as address data as beforementioned. Moreover, while not shown, it is also possible to provide the engine with a coolant temperature sensor or the like and use the output thereof for appropriately compensating the retrieved basic ignition timing.

The procedure then moves to step 62 where it is determined whether or not the engine is in an operating region in which knocking control is unnecessary. By an "operating region in which knocking control is unnecessary" is meant an operating region in which the engine speed is below a prescribed level, for example 500–600 rpm or in which another predetermined operating condition or conditions occur. Whether or not the engine is in such an operating region is determined on the basis of, for example, the output of the crankshaft angle sensor 12.

When it is found in the step 62 that the engine is in an operating region in which knocking is unnecessary, the procedure moves to step 64 where it is determined whether or not a wait period Iw defined as a predetermined number of firings has passed. The wait period will be explained later. And if it has, the procedure moves to step 66 where a slight amount of advancing adjustment $d\theta A$ is added to the retarding adjustment $\theta kc$ implemented up to that time for the purpose of preventing knocking. (In the flowchart, retardation of the ignition angle is shown as subtraction while advancement thereof is shown as addition. The initial value of the knocking compensation amount $\theta kc$ is zero. As advancing adjustment $d\theta A$ is positive, the adjustment in the step 66 will be in the direction of ignition advance.)

In the step 62, when it is found that the engine operation is not in the operating region in which knocking control is unnecessary, the procedure moves to step 68 where it is determined whether or not knocking has occurred and if knocking has not occurred the procedure moves to step 70 where it is determined from the rate of change calculated from the output of the throttle sensor 22 whether the engine operating state is rapidly accelerating at that instant. That is, the calculated value is compared with a predetermined value and it is determined that the engine is accelerating at that instant if the former value is larger than the latter. Alternatively, the accelerating state may be determined from the rate of changes per unit time in the outputs of the crankshaft angle sensor 12 and the pressure sensor 20.

When it is determined in step 70 that the engine is accelerating at that instant, the procedure moves to step 72 where it is determined whether or not the frequency of knocking occurrence is equal to or greater than a predetermined value. This determination is made by determining whether or not the rate of knocking is equal to or higher than a predetermined value over a period starting several firings earlier. Specifically, it is determined whether $$Ika/In > Ikr/In,$$

where Ika is the number of firings at which knocking actually occurred, Ikr is a reference value for comparison and In is the number of firings (the period) over which the determination is made. These calculation coefficients Ikr and In are obtained from a graph shown in FIG. 3 using the value of the engine speed calculated before. The values are stored in the ROM 42d. The other coefficient Ika is obtained by counting the number of firings at which knocking actually occurred.

Figure 3:
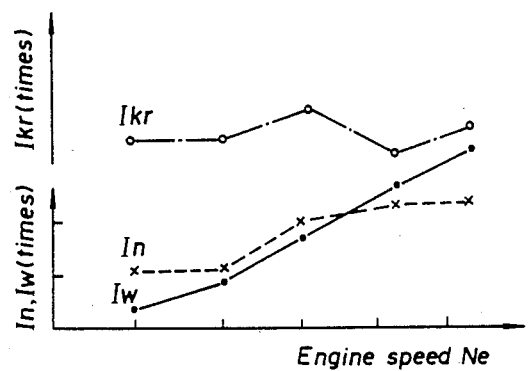
FIG. 3 is a graph showing calculation coefficients used in determining advancement of the ignition timing.
Figure 4:
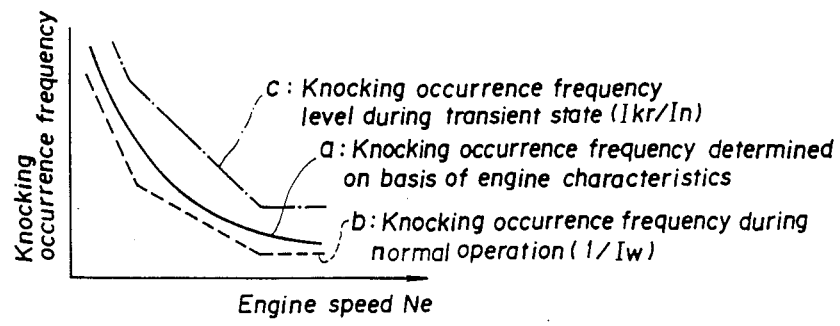
FIG. 4 is a graph showing relationship between the calculation coefficients of FIG. 3 and engine operating conditions.

When it is determined in the step 72 that the frequency of knocking occurrence is not less than the predetermined value, compensation of the ignition timing in the advance direction is stopped and the compensation value used in the preceding cycle is maintained unchanged (step 74). On the other hand, when the frequency of knocking occurrence is less than the predetermined value or the engine is not the rapid acceleration state, the procedure moves to the step 64 where it is determined whether the ignition advance wait period Iw has passed, and if it has, ignition timing is slightly restored in step 66 as mentioned earlier. If it has not, ignition compensation in the advance direction is stopped and the compensation value used in the preceding cycle is used again (step 74). The value Iw is shown in FIG. 3 which is also stored in ROM 42$d$ as well as the other coefficients Ikr and Ir. The value Iw is similarly retrieved from the engine speed. The frequency of knocking occurrence and the ignition advance wait period will be explained with reference to FIG. 4. Namely, when the engine is operating at low speed it is preferable to time the ignition to occur in the vicinity of the point at which trace knocking occurs so as to obtain optimum output from the engine. However, since in high speed operation knocking is apt to cause damage to the engine, it is necessary to keep the ignition timing at a more retarded position. Thus, as shown in FIG. 4, during normal engine operation, it is desirable that the ignition timing of the engine be controlled such that the knocking occurrence frequency (Curve b) is lower than the aforesaid trace knocking level indicated by the Curve a, this trace knocking level being determined from the intrinsic characteristics of the engine as a knocking occurrence frequency that is inversely proportional to the engine speed. On the other hand, during rapid acceleration of engine operation, it becomes impossible to obtain the required increase in engine output without increasing the frequency of knocking. However, even in this case, for protecting the engine it is necessary to keep the frequency of knocking below a prescribed limit value (Curve c). Therefore, at the time of determining the advancing adjustment of the ignition timing following prevention of knocking, a plurality of reference knocking occurrence frequencies are set and the ignition timing is controlled after discriminating whether the engine is in a normal or a transient state of operation, whereby it becomes possible to obtain a uniform knocking occurrence frequency irrespective of changes in the engine operating condition as well as to operate the engine at optimum output. The values shown for the reference number of firings with knocking Ikr etc. in FIG. 3 are set on the basis of the knocking occurrence frequency of FIG. 4, and Ikr/In is set to correspond to the knocking occurrence frequency during knocking (Curve c of FIG. 4) and 1/Iw is set to correspond to the knocking occurrence frequency during normal operation (Curve b in FIG. 4). More specifically, the ignition advance wait period Iw can, in the sense that a single occurrence of knocking is permissible within this period, be thought of as the reciprocal of the knocking occurrence frequency.

Again returning to FIG. 2, when it is found in the step 68 that knocking has occurred, retarding adjustment is carried out by the amount of $d\theta R$ (step 76). In the final step 78, the retarding adjustment $\theta kc$ for knocking prevention is added to the basic ignition timing $\theta b$ to obtain the ignition timing $\theta ig$.

In accordance with the present invention, since the advancing adjustment is carried out only once per predetermined number of firings and the adjustment is carried out not by eliminating the retarding adjustment $\theta kc$ all at one time but by reducing it gradually in increments of a very small advancing adjustment $d\theta A$, no hunting is caused by torque variation or the like so that the drivability of the vehicle powered by the engine is improved.

The present invention has thus been shown and described with reference to specific embodiments. However, it should be noted that the present invention is in no way limited to the details of the described arrangements but changes and modifications may be made without departing from the scope of the appended claims.

What is claimed is:

1. An apparatus for controlling ignition timing in an internal combustion engine, comprising:
   a first means for detecting an angular position of an engine crankshaft to generate an output signal indicative of engine speed;
   a second means for detecting a state of engine load to generate an output signal in response thereto;
   a third means for detecting a knocking condition of the engine to generate an output signal in response thereto;
   a control means for receiving the output signals of the first, second and third means to determine a basic ignition timing of the engine based upon the detected engine speed and engine load and when the knocking condition is detected, adjusting the basic ignition timing in a retard direction, said control means comparing the detected engine speed with a predetermined low engine speed to determine a region of engine operation in which knocking control is unnecessary and when an engine operation is detected to be in the region with the ignition timing still retarded, slightly adjusting the retarded ignition timing in an advance direction, the slight adjustment occurring once per predetermined number of firings which are proportional to the engine speed, said control means generating an output signal based upon the determined ignition timing; and
   ignition means for receiving the output signal of the control means to ignite an air/fuel mixture in a combustion chamber of the engine.

2. An apparatus according to claim 1, further comprising a fourth means for detecting a rapid acceleration of the engine to generate an output signal in response thereto and wherein, said control means receives the output signal of the fourth means and when the engine operation is detected to be out of the region, slightly adjusts the retarded ignition timing in the advance direction, the slight adjustment occurring once per said predetermined number of firings if the rapid acceleration is not detected or if a knocking occurrence rate is below a predetermined knocking occurrence rate even when the rapid acceleration is detected.

3. An apparatus according to claim 2, wherein said predetermined knocking occurrence rate is inversely proportional to the engine speed.

* * * * *